No. 865,056. PATENTED SEPT. 3, 1907.
W. S. PALMER.
REPAIR CLIP FOR PIPES, SHAFTS, &c.
APPLICATION FILED APR. 12, 1907.
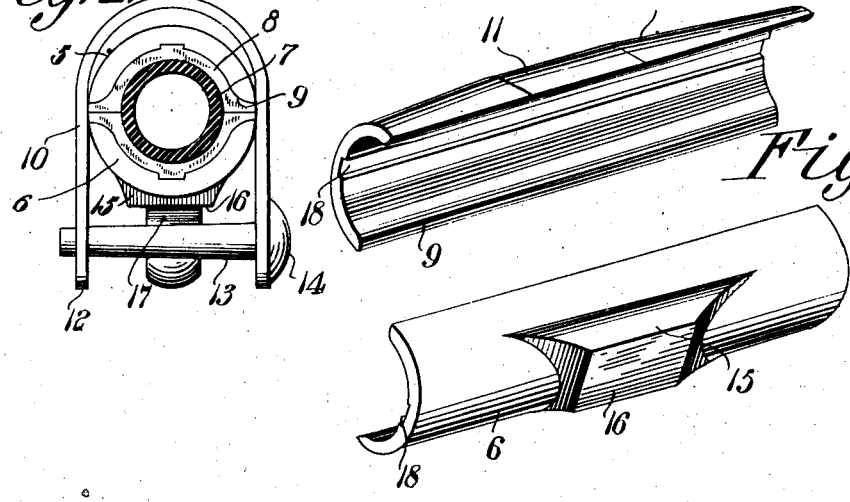
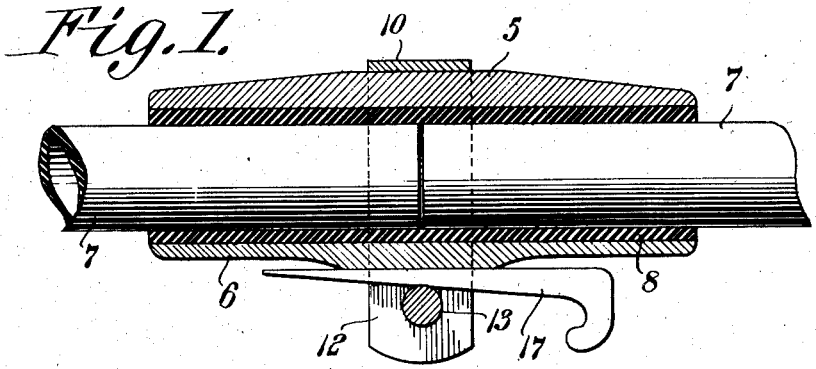
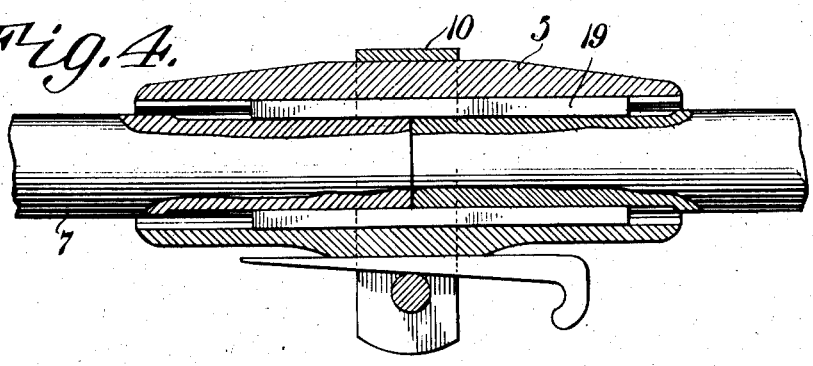
WITNESSES:
Winfield S. Palmer, INVENTOR
By C. A. Snow & Co.
ATTORNEYS ns and steam tight joint between the same.

UNITED STATES PATENT OFFICE.

WINFIELD SCOTT PALMER, OF GLENBURN, PENNSYLVANIA.

REPAIR-CLIP FOR PIPES, SHAFTS, &c.

No. 865,056.

Specification of Letters Patent.

Patented Sept. 3, 1907.

Application filed April 12, 1907. Serial No. 367,787.

*To all whom it may concern:*

Be it known that I, WINFIELD SCOTT PALMER, a citizen of the United States, residing at Glenburn, in the county of Lackawanna and State of Pennsylvania, have invented a new and useful Repair-Clip for Pipes, Shafts, &c., of which the following is a specification.

This invention relates to clamping members or clips for mending or coupling pipes, broken shafts, masts and the like and has for its object to provide a strong, durable and efficient device of this character by means of which adjacent pipe on the shaft sections may be temporarily or permanently united.

A further object of the invention is to provide a sectional clamp adapted to embrace the pipe or shaft sections to be united and provided with seating recesses for the reception of a packing strip, the lower longitudinal edges of each clamp section being inclined or beveled thereby to force the packing in contact with the pipe sections and thus insure a water and steam tight joint.

A further object is to provide a clip or yoke for supporting the clamping members in engagement with the pipe sections and further to provide a key or wedge for locking the several parts in operative position.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a longitudinal sectional view of a clamp or coupling constructed in accordance with my invention. Fig. 2 is an end view of the same. Fig. 3 is a perspective view of the clamping members or sections detached. Fig. 4 is a longitudinal sectional view showing the clamp used for uniting adjacent sections of shafting.

Similar numerals of reference indicate corresponding parts in all of the figures of the drawings.

The improved device comprises a pair of clamping members 5 and 6 each preferably semi-cylindrical in form and having their inner faces concaved to accommodate the pipe or shaft sections 7.

Interposed between the clamping members or sections 5 and 6 and the pipe sections 7 is a packing 8 formed of rubber, asbestos or other suitable material the inner longitudinal edges of the clamping members being inclined or beveled as indicated at 9 so that when the clamping members are placed in position on the pipe sections the inclined edges 9 of the clamping members will force the adjacent edges of the packing strip inwardly in engagement with the pipe sections thereby to insure a water and steam tight joint between the same.

Embracing the clamping members or sections 5 and 6 is a retaining yoke or clip 10 the closed end of which bears against the intermediate curved portion 11 of the upper clamping member 5 while the spaced arms 12 of said clip or yoke embraces the lower section 6 and are provided with spaced perforations in which is journaled a transverse pin or stud 13. The pin or stud 13 is provided with an enlarged head 14 and is preferably inclined or tapered to facilitate positioning the pin in the openings in the yoke.

Secured to or formed integral with the lower section 6 is a boss or enlargement 15 having a flat bearing surface 16 for engagement with a locking key or wedge 17, the latter being interposed between the pin 13 and the flat bearing surface 16 thereby to clamp the several parts in locked position.

The opposite ends of the clamping members 5 and 6 are preferably inclined so as to permit the retaining yoke or clip 9 to be readily positioned on said clamping members.

In uniting two sections of pipe the clamping members are positioned at the juncture of said pipe sections and retained in said position by means of the clip or yoke after which the wedge 17 is interposed between the pin 13 and the flat bearing surface 16 thus forcing the inclined edges in engagement with the packing strip and forcing the latter against the pipe sections.

In order to remove the clamp it is merely necessary to disengage the locking key or wedge 17 and then remove the pin 13 when the yoke 10 may be disengaged from the clamping members and the latter together with the packing removed from the pipe sections.

The convex faces of the clamping members 5 and 6 are preferably provided with longitudinal grooves or seats 18 for the reception of a key or spline 19 which engages a corresponding key seat formed in adjacent shaft sections 20 when two or more of said shaft sections are to be united, as best shown in Fig. 4 of the drawing.

When the clamp is used for uniting shaft sections the packing is dispensed with, the key 19 being interposed between the sections of shafting and the clamping members, as shown.

From the foregoing description it will be seen that there is provided an extremely simple, inexpensive and efficient device admirably adapted for the attainment of the ends in view.

Having thus described the invention what is claimed is:

1. A coupling including a sectional clamping member, a yoke embracing said clamping member and having one end thereof provided with a transverse pin, and a locking key interposed between the pin and adjacent section of the clamping member.

2. A coupling including mating sections adapted to engage the work, a packing interposed between said sections and the work, a yoke embracing the sections, and a key bearing against the yoke and one of the sections for clamping both sections in engagement with the work.

3. A coupling including mating sections having their inner longitudinal edges inclined and adapted to embrace the work, a packing interposed between the sections and work, a yoke embracing said sections and provided with alined openings, a pin seated in said openings, and a locking key interposed between the pin and the adjacent section for locking said sections in engagement with the work.

4. A coupling including mating sections adapted to engage the work and having their inner longitudinal edges inclined, one of said sections being provided with a curved bearing surface and the adjacent section with a flat bearing surface, a packing interposed between the sections and the work, and a yoke embracing both sections and bearing against the curved portion of the adjacent section, a pin piercing the yoke, and a locking key interposed between the pin and the flat bearing surface of the adjacent section for locking said sections in engagement with the work.

5. A coupling including semi-cylindrical mating sections adapted to embrace the work and having their opposite ends inclined and their inner longitudinal edges curved laterally, a packing interposed between the work and said sections, a yoke embracing the sections, and a key interposed between the yoke and one of said sections for locking both sections in engagement with each other.

6. A coupling including mating sections adapted to embrace the work and each provided with a longitudinal key seat, a yoke embracing said sections, a transverse pin piercing the yoke, and a wedge interposed between the pin and the adjacent section for clamping said sections in engagement with the work.

7. A coupling including semi-cylindrical mating sections adapted to clamp the work and having their concaved faces provided with longitudinal key seats and their opposite longitudinal edges inclined, a packing carried by each section, a yoke embracing said sections, a transverse pin piercing the yoke, and a locking key interposed between the pin and adjacent section for clamping both sections in engagement with the work.

8. A coupling including semi-cylindrical sections adapted to embrace the work and each provided with a longitudinal key seat, one of said sections being provided with a curved bearing surface and the opposite section formed with a central enlargement having a flat bearing surface, a yoke engaging the curved bearing surface and having its opposite ends extended beyond the adjacent section and provided with alined openings, a pin extending transversely through said openings, a key carried by each section, and a wedge interposed between the pin and the flat bearing surface of the adjacent section for clamping both sections in engagement with the work.

9. A coupling including mating sections having concaved faces for the reception of the work and having their inner longitudinal edges inclined, there being longitudinal grooves formed in the concave face of each section, a packing seated in the groove of each section and extended laterally in alinement with the longitudinal edges of said sections, one of said sections being provided with a curved bearing surface and the opposite section with an enlargement having a flat bearing surface, a yoke engaging the curved bearing surface of one section and having its opposite ends extended beyond the flat bearing surface and provided with alined openings, a pin seated in said openings, and a wedge shaped locking key interposed between the pin and flat bearing surface of the adjacent section for locking both sections in engagement with the work.

In testimony that I claim the foregoing as my own, I have hereto affixed my signature in the presence of two witnesses.

WINFIELD SCOTT PALMER.

Witnesses:
   E. O. BIDDLEMAN,
   E. I. PAINE.